(12) United States Patent
Jeong

(10) Patent No.: US 12,436,911 B2
(45) Date of Patent: Oct. 7, 2025

(54) INTERFACE DEVICE AND COMPUTING SYSTEM INCLUDING THE SAME

(71) Applicant: SK hynix Inc., Gyeonggi-do (KR)

(72) Inventor: Jong Heon Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 292 days.

(21) Appl. No.: 17/957,025

(22) Filed: Sep. 30, 2022

(65) Prior Publication Data

US 2023/0315672 A1 Oct. 5, 2023

(30) Foreign Application Priority Data

Apr. 1, 2022 (KR) .................. 10-2022-0040881

(51) Int. Cl.
*G06F 13/42* (2006.01)
*G06F 13/38* (2006.01)

(52) U.S. Cl.
CPC ........ *G06F 13/4221* (2013.01); *G06F 13/385* (2013.01)

(58) Field of Classification Search
None
See application file for complete search history.

(56) References Cited

U.S. PATENT DOCUMENTS

| | | | | |
|---|---|---|---|---|
| 5,585,708 A | * | 12/1996 | Richardson | H02P 27/06 363/98 |
| 7,633,877 B2 | * | 12/2009 | Sharma | H04L 43/50 370/241 |
| 2013/0007502 A1 | * | 1/2013 | Iyer | G06F 11/1423 714/E11.071 |
| 2013/0051483 A1 | * | 2/2013 | Wyatt | H04L 25/03885 375/259 |
| 2013/0067127 A1 | * | 3/2013 | Hopgood | G06F 13/00 710/104 |
| 2020/0076693 A1 | * | 3/2020 | Gopalarathnam | H04L 41/0886 |
| 2020/0371579 A1 | * | 11/2020 | Selvam | G06F 13/4282 |
| 2021/0391973 A1 | * | 12/2021 | Jeon | H04L 7/0079 |
| 2022/0021412 A1 | * | 1/2022 | Iwai | H04B 1/7073 |
| 2022/0255542 A1 | * | 8/2022 | Iwai | G06F 1/04 |
| 2022/0261311 A1 | * | 8/2022 | Jeon | G06F 11/10 |
| 2022/0398177 A1 | * | 12/2022 | Sunayama | G06F 11/2733 |

* cited by examiner

*Primary Examiner* — Henry Tsai
*Assistant Examiner* — Aurangzeb Hassan
(74) *Attorney, Agent, or Firm* — IP & T GROUP LLP

(57) ABSTRACT

An interface device includes: a plurality of ports for forming a plurality of lanes; and a link controller for setting a speed of a link including the plurality of lanes by determining the speed of the link, based on a cause of entrance into a configuration state of the link.

14 Claims, 14 Drawing Sheets

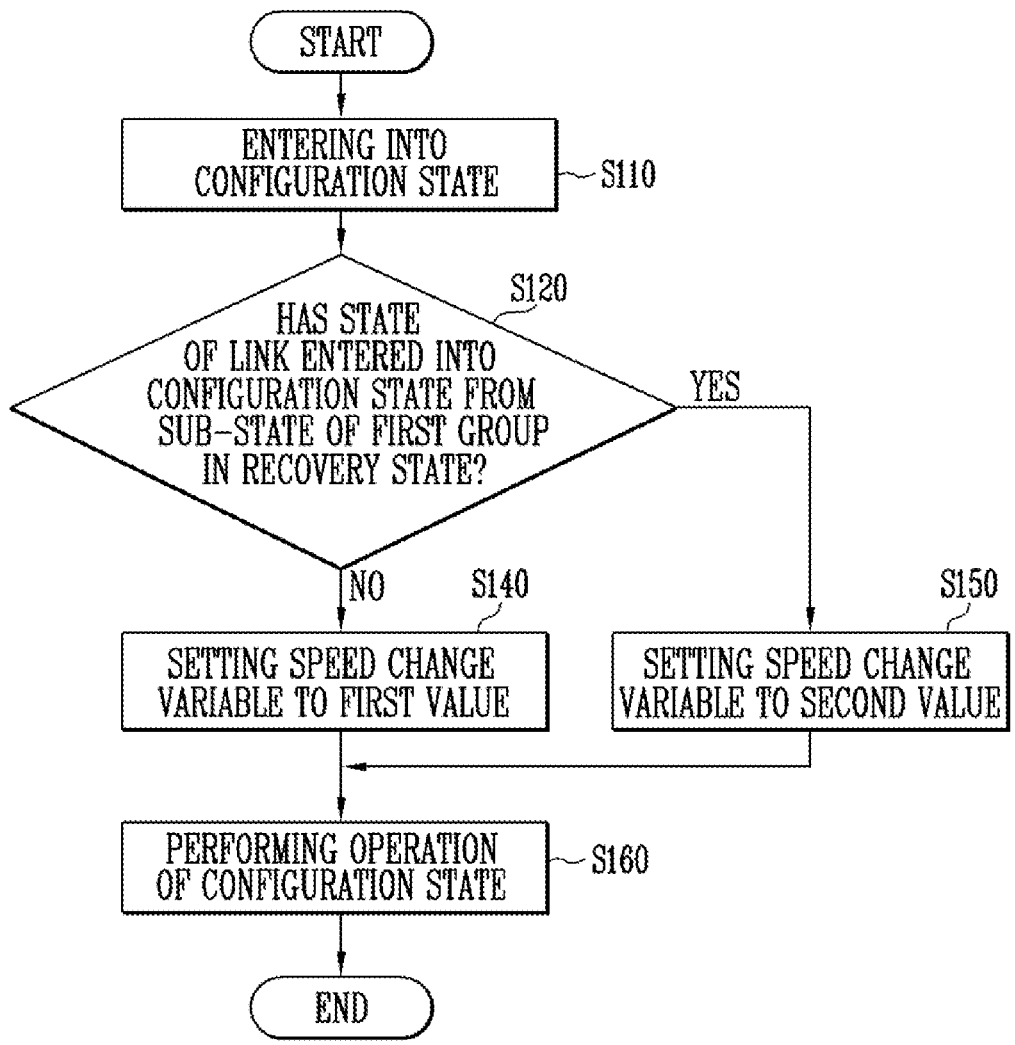

INTERFACE DEVICE AND COMPUTING SYSTEM INCLUDING THE SAME

CROSS-REFERENCE TO RELATED APPLICATION

The present application claims priority under 35 U.S.C. § 119 (a) to Korean patent application number 10-2022-0040881, filed on Apr. 1, 2022, the entire disclosure of which is incorporated herein by reference.

BACKGROUND

Field of Invention

The present disclosure generally relates to an electronic device, and more particularly, to an interface device and a computing system including the same.

Description of Related Art

Peripheral component interconnect (PCI) defines a bus protocol used to connect input/output devices to a host device. PCI express (PCIe) is used to define a physical communication layer as a high speed serial interface while having a programming concept defined in the PCI standard.

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Various embodiments of the present disclosure provide an interface device and a computing system including the same, which can adaptively control a link speed according to an entry factor of a configuration operation during a link setting operation.

In accordance with an aspect of the present disclosure, there is provided an interface device including: a plurality of ports configured to form a plurality of lanes; and a link controller configured to set a speed of a link including the plurality of lanes by determining the speed of the link based on a cause of entrance into a configuration state of the link.

In accordance with another aspect of the present disclosure, there is provided a method of operating an interface device, the method including: allowing a state of a link connected to an external device to enter into a configuration state; and setting a speed of the link by determining the speed of the link, based on a state of the link just before the configuration state.

In accordance with still another aspect of the present disclosure, there is provided a method of operating an interface device, the method including: allowing a state of a link connected to an external device to enter into a configuration state; first determining whether the state of the link is to enter into a configuration state while the state of the link is one sub-state among sub-states of a recovery state; and secondly determining a speed of the link in response to the first determining.

In accordance with still another aspect of the present disclosure, there is provided an operating method of a device, the operating method including: setting, while configuring a link including a plurality of lanes, a speed of the link to a first value according to a first state of the link immediately before the configuring; and setting, while configuring the link, the speed to a second value according to a second state of the link immediately before the configuring.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 13 is a flowchart illustrating an operating method of a configuration state in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
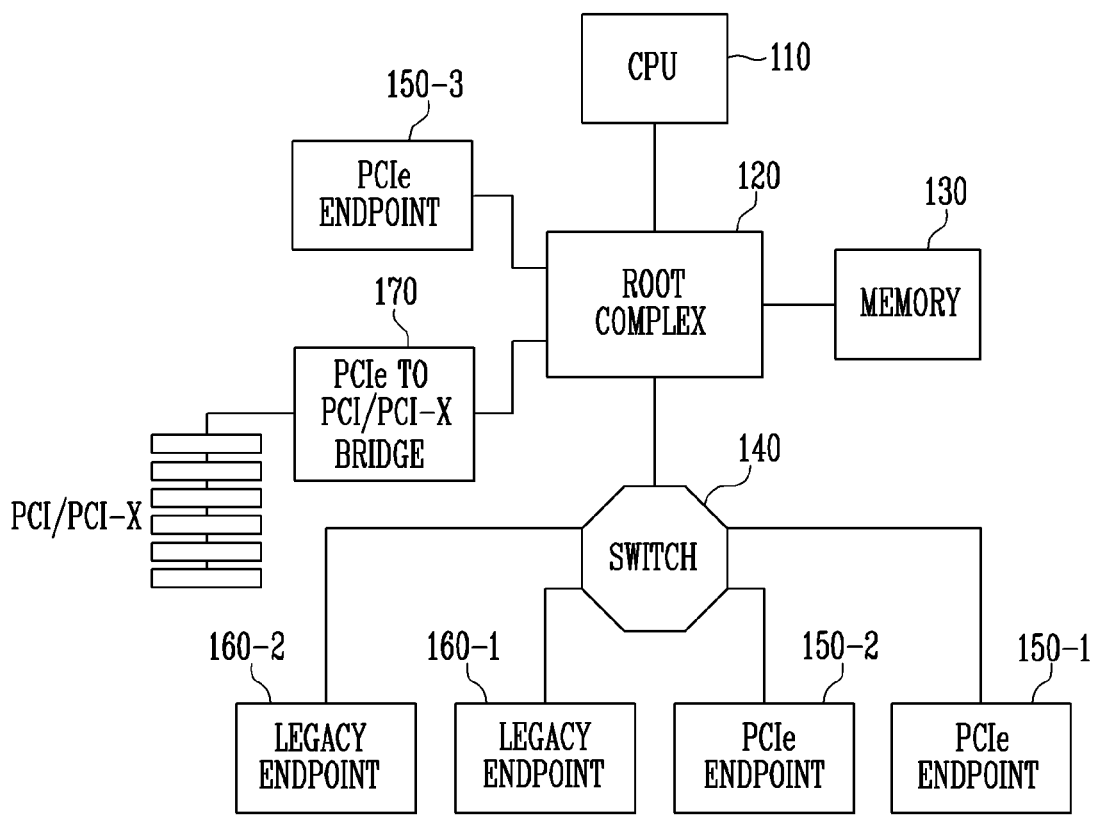
FIG. 1 is a diagram illustrating a computing system in accordance with an embodiment of the present disclosure.

FIG. 1 is a diagram illustrating a computing system in accordance with an embodiment of the present disclosure.

Referring to FIG. 1, a computing system 100 may include a CPU 110, a root complex 120, a memory 130, a switch 140, peripheral component interconnect express (PCIe) endpoints 150_1 to 150_3, legacy endpoints 160_1 and 160_2, and a PCIe bridge 170.

The computing system 100 may be an electronic device which supports communication using a PCIe interface. The computing system 100 may be a PC, a laptop computer, or a mobile computing device, and include an expansion card, an expansion board, an adaptor card, an add-in card, or an accessory card. Also, the computing system 100 may include a printed circuit board (PCB) which can be inserted into an electrical connector or an expansion slot on a main board of the computing system 100 to provide an additional function to the computing system 100 through an expansion bus. Also, the computing system 100 may include a storage device such as a solid state drive (SSD), and include a graphic card, a network card, a USB card, or the like.

The CPU 110 may be electrically connected to each component of the computing system 100, and control each operation of the computing system 100. Specifically, the CPU 110 may control components of hardware or software, connected to the CPU 110, by driving an operating system or an application program, and perform various data processing and calculations. Also, the CPU 110 may execute software or an application, which is used to control an operation of the computing system 100.

The root complex 120 may be a root hub, a controller hub, or a root controller in a PCIe interconnect architecture. For example, the root complex 120 may include a chipset, a memory controller hub (MCH), a north bridge, an interconnect controller hub (ICH), a south bridge, and a root controller/hub. Also, the root complex 120 may connect the CPU 110 and the memory 130 to an input/output (I/O) hierarchy. The root complex 120 may support a peer-to-peer (P2P) routing. The root complex 120 may include at least one host bridge and at least one root port. The root complex 120 may support at least one PCIe port.

The memory 130 may store data, commands, or a program code, necessary for an operation of the computing system 100. In an embodiment, the memory 130 may store program codes for executing one or more operating systems (OSs) and one or more virtual machines (VMs) and program codes for executing a virtualization intermediary (VI) for managing the VMs. Also, the memory 130 may be implemented as a volatile memory device such as a DRAM or an SRAM.

The switch 140 may route a packet or message upstream or downstream. Specifically, the switch 140 may route the packet or message upstream to a layer toward the root complex 120 from a PCIe endpoint (e.g., 150_1). Also, the switch 140 may route the packet or message downstream to a layer toward a PCIe endpoint (e.g., 150_2) from the root complex 120.

The switch 140 may be designated as a logic assembly of a plurality of virtual PCI-to-PCI bridge devices. A device which may be connected to the switch 140 may include an arbitrary internal or external device or a component, which is connected to electronic systems such as a network interface controller (NIC), an add-in card, an audio processor, a network processor, a hard-drive, a storage device, a CD/DVD ROM, a monitor, a printer, a mouse, a keyboard, a router, a mobile storage device, a firewire device, a universal serial bus (USB), a scanner, and other input/output devices. Although not shown in detail, the device may include a PCIe-to-PCI/PCI-X bridge supporting a PCI device of a legacy version or another version.

In an embodiment, the root complex 120 may be connected to an endpoint. The endpoint may represent a type of function which may become a requester or completer of a PCIe transaction. The endpoint may be classified into a legacy endpoint and a PCIe endpoint.

The PCIe endpoints 150_1 to 150_3 and the legacy endpoints 160_1 and 160_2 may serve as the requester or completer of the PCIe transaction. A transaction layer packet (TLP) communicated by the PCIe endpoints 150_1 to 150_3 and the legacy endpoints 160_1 and 160_2 may provide a configuration space header. Also, the PCIe endpoints 150_1 to 150_3 and the legacy endpoints 160_1 and 160_2 may provide a configuration request as a completer. In a specific condition, a transaction layer packet (TLP) communicated by the PCIe endpoints 150_1 to 150_3 and the legacy endpoints 160_1 and 160_2 must provide a configuration space header. Also, the PCIe endpoints 150_1 to 150_3 and the legacy endpoints 160_1 and 160_2 must provide a configuration request as a completer.

The PCIe endpoints 150_1 to 150_3 and the legacy endpoints 160_1 and 160_2 may be divided according to the size of a memory transaction. For example, when the memory transaction exceeding 4 GB is possible, the endpoint may be the PCIe endpoints 150_1 to 150_3. When the memory transaction exceeding 4 GB is impossible, the endpoint may be the legacy endpoints 160_1 and 160_2. The PCIe endpoints 150_1 to 150_3 must not generate any input/output request, but the legacy endpoints 160_1 and 160_2 may provide or generate an input/output request. In addition, the PCIe endpoint 150_3 may communicate a TLP with the root complex 120. In addition, PCI/PCI-X may communicate a TLP with the root complex 120 through the PCIe bridge 170. The PCIe endpoints 150_1 and 150_2 or the legacy endpoints 160_1 and 160_2 may communicate a TLP with the switch 140.

The PCIe endpoints 150_1 to 150_3 may be a function having a type 00h configuration space header. The PCIe endpoints 150_1 to 150_3 may support a configuration request as a completer. A PCIe compatible software driver and an application program may be operated such that any lock semantic is not used when the PCIe endpoints 150_1 to 150_3 are accessed. The PCIe endpoints 150_1 to 150_3 operating as the requester of the memory transaction may generate an address greater than 4 GB. When an interrupt resource is requested, the PCIe endpoints 150_1 to 150_3 may be necessary to support message signaled interrupt (MSI), MSI-X, or both of them. When the MSI is implemented, the PCIe endpoints 150_1 to 150_3 may support a 64-bit message address version of an MSI functional structure. A minimum memory address range requested by a base address register may be 128 bytes. The PCIe endpoints 150_1 to 150_3 may exist in one of hierarchy domains started in the root complex 120.

The legacy endpoints 160_1 and 160_2 may be a function having a type 00h configuration space header. The legacy endpoints 160_1 and 160_2 may support a configuration request as a completer. The legacy endpoints 160_1 and 160_2 may support an I/O request as the completer. The legacy endpoints 160_1 and 160_2 may accept an I/O request for one or both of positions 80*h* and 84*h*, regardless of the I/O decode configuration of a corresponding endpoint. The legacy endpoints 160_1 and 160_2 may generate an I/O request. The legacy endpoints 160_1 and 160_2 may include extended configuration space capabilities. The legacy endpoints 160_1 and 160_2 operating as the requester of the memory transaction may not generate an address having 4 GB or more. When an interrupt resource is requested, the legacy endpoints 160_1 and 160_2 are necessary to support the MSI, the MSI-X, or both of them. When the MSI is implemented, the legacy endpoints 160_1 and 160_2 may support a 32-bit or 64-bit message address version of the MSI functional structure. The legacy endpoints 160_1 and 160_2 may support 32-bit address specification with respect to the base address register which requests a memory resource. The legacy endpoints 160_1 and 160_2 may exist in one of the hierarchy domains originated in the root complex 120.

Figure 2:
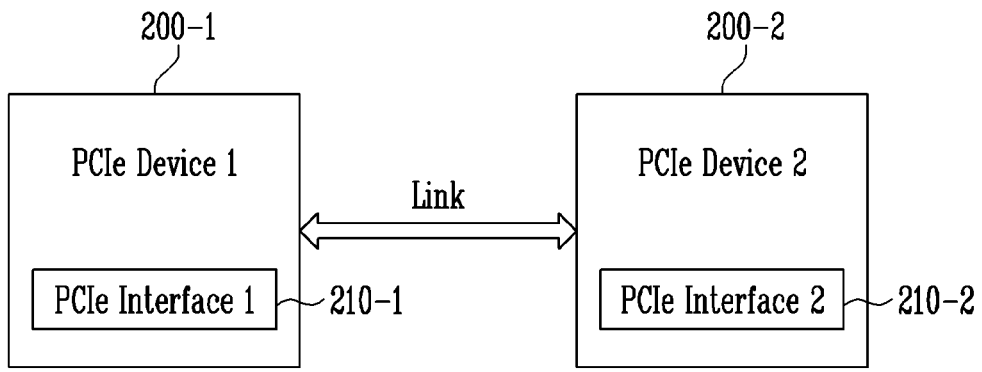
FIG. 2 is a diagram illustrating a Peripheral Component Interconnect express (PCIe) device in accordance with an embodiment of the present disclosure.

FIG. 2 is a diagram illustrating a PCIe device in accordance with an embodiment of the present disclosure.

Referring to FIG. 2, the PCIe device may include a PCIe interface, and be an electronic device which supports transmission/reception using the PCIe interface. For example, a first PCIe device 200-1 or a second PCIe device 200-2 may be one of the root complex 120, the switch 140, the PCIe endpoints 150_1 to 150_3, the legacy endpoints 160_1 and 160_2, and the PCIe bridge 170, which are shown in FIG. 1.

Also, the first PCIe device 200-1 or the second PCIe device 200-2 may perform communication by using a first PCIe interface 210-1 or a second PCIe interface 210-2. Specifically, the first PCIe device 200-1 may convert data to be transmitted from the second PCIe device 200-2 into a protocol suitable for communication by using the first PCIe interface 210-1. In addition, the first PCIe device 200-1 and the second PCIe device 200-2 may form a link. The first PCIe device 200-1 and the second PCIe device 200-2 may communicate with each other through the formed link. For example, the first PCIe device 200-1 or the second PCIe device 200-2 may transmit/receive a packet through the link.

Figure 3:
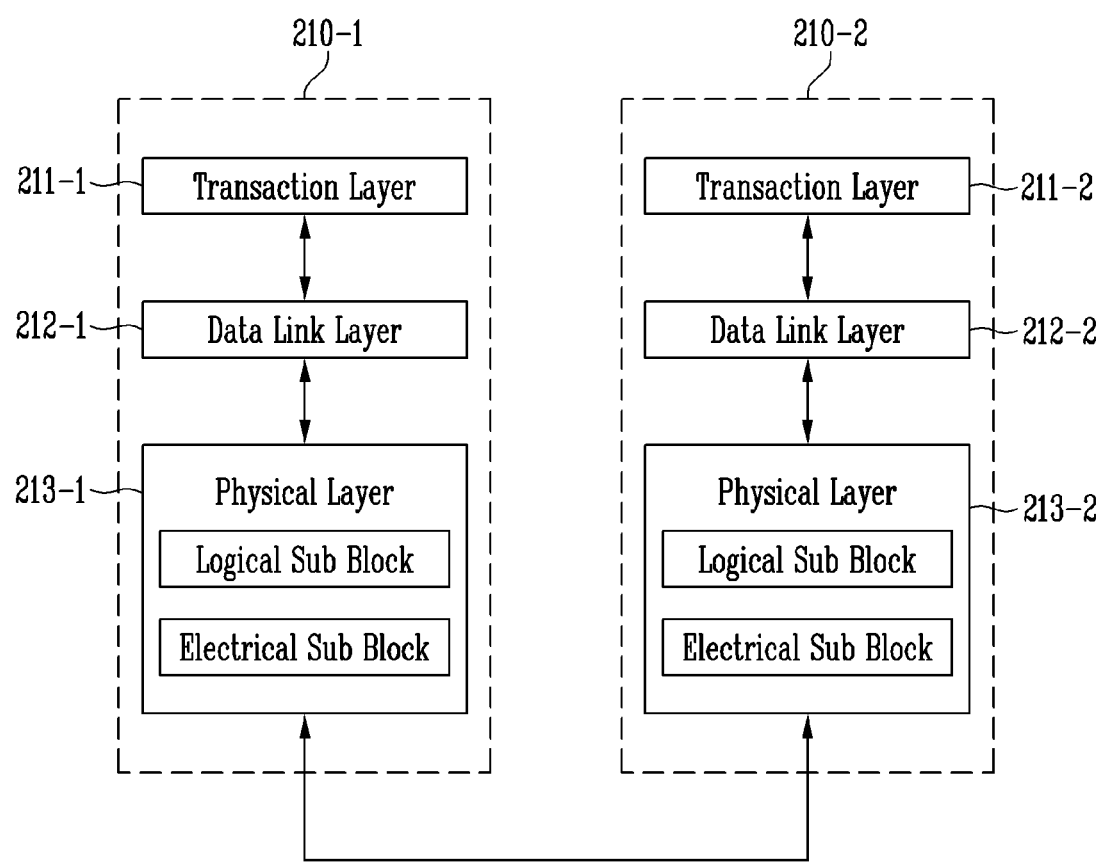
FIG. 3 is a diagram illustrating a PCIe interface in accordance with an embodiment of the present disclosure.

FIG. 3 is a diagram illustrating a PCIe interface in accordance with an embodiment of the present disclosure.

Referring to FIG. 3, a first PCIe interface 210-1 and a second PCIe interface 210-2 are illustrated. The first PCIe interface 210-1 and the second PCIe interface 210-2 may be formed in the same structure. Therefore, for convenience of discussion, the first PCIe interface 210-1 will be mainly described.

PCIe layers included in the first PCIe interface 210-1 may include three discrete logical layers. For example, the first PCIe interface 210-1 may include a transaction layer 211-1, a data link layer 212-1, and a physical layer 213-1. Similarly, the second PCIe interface 210-2 may include a transaction layer 211-2, a data link layer 212-2, and a physical layer 213-2. Each of the layers may include two sections. One section may process outbound (or transmitted) information, and the other may process inbound (or received) information. Also, the first PCIe interface 210-1 may use packets to communicate information between other PCIe interfaces.

An upper layer in the structure of the PCIe interface may be the transaction layer. The transaction layer may assemble and disassemble transaction layer packets (TLPs). Also, the transaction layer May implement a split transaction, i.e., a transaction which allows another traffic to be transferred through a link while a target system assembles data necessary for a response. In an embodiment, four transaction address spaces may include a configuration address space, a memory address space, an input/output address space, and a message address space. A memory space transaction may include one or more of read and write requests to transfer data to/from a memory-mapped location. In one embodiment, the memory space transaction may use two different address formats, e.g., a short address format, such as a 32-bit address, or a long address format, such as 64-bit address. A configuration space transaction may be used to access a configuration space of the PCIe devices. A transaction to the configuration space may include read and write requests. A message space transaction (or message) may be defined to support in-band communication between PCIe devices.

The transaction layer may store link configuration information, etc. Also, the transaction layer may generate a TLP, or convert a received TLP into a payload or status information.

A middle layer in the structure of the PCIe interface may be the data link layer, and the data link layer may perform a function of an intermediate stage between the transaction layer and the physical layer. A major function of the data link layer may be link management and data integrity including error detection and error correction. Specifically, a transmission side of the data link layer may accept TLPs assembled in the transaction layer, provide a data protection code, or calculate a TLP sequence number. Also, the transmission side of the data link layer may transmit the data protection code and the TLP sequence number to the physical layer such that the data protection code and the TLP sequence number are transmitted through the link. A reception side of the data link layer may check the data integrity of TLPs received from the physical layer, and transmit the TLPs to the transaction layer to perform additional processing.

The physical layer may include all circuitry for an interface operation. The all circuitry may include a driver, an input buffer, a series-parallel conversion circuit, a parallel-series conversion circuit, phase locked loops (PLLs), and an impedance matching circuit.

Also, the physical layer may include a logical sub-block and an electrical sub-block, which physically transmit a packet to an external PCIe device. The logical sub-block may perform a role necessary for a 'digital' function of the physical layer. In relation to this, the logical sub-block may include a transmission section for preparing sending information to be transmitted by the physical sub-block and a reception section for identifying and preparing information received before the received information is transferred to the data link layer. The physical layer may include a transmitter and a receiver. The transmitter may receive a symbol transmitted to an external device as the transmitter is serialized by the logical sub-block. In addition, the receiver may receive a serialized symbol from the external device, and convert the received symbol into a bit stream. The bit stream may be deserialized to be supplied to the logical sub-block. That is, the physical layer may convert TLPs received from the data link data into a serialized format, and convert a packet received from the external device into a deserialized format.

Also, the physical layer may include logical functions associated with interface initialization and maintenance.

Although the structure of the first PCIe interface 210-1 and the second PCIe interface 210-2 are illustrated in FIG. 3, the structure of the first PCIe interface 210-1 and the second PCIe interface 210-2 may include an arbitrary form such as a quick path interconnect structure, a next generation high performance computing interconnect structure, or another hierarchical structure.

Figure 4:
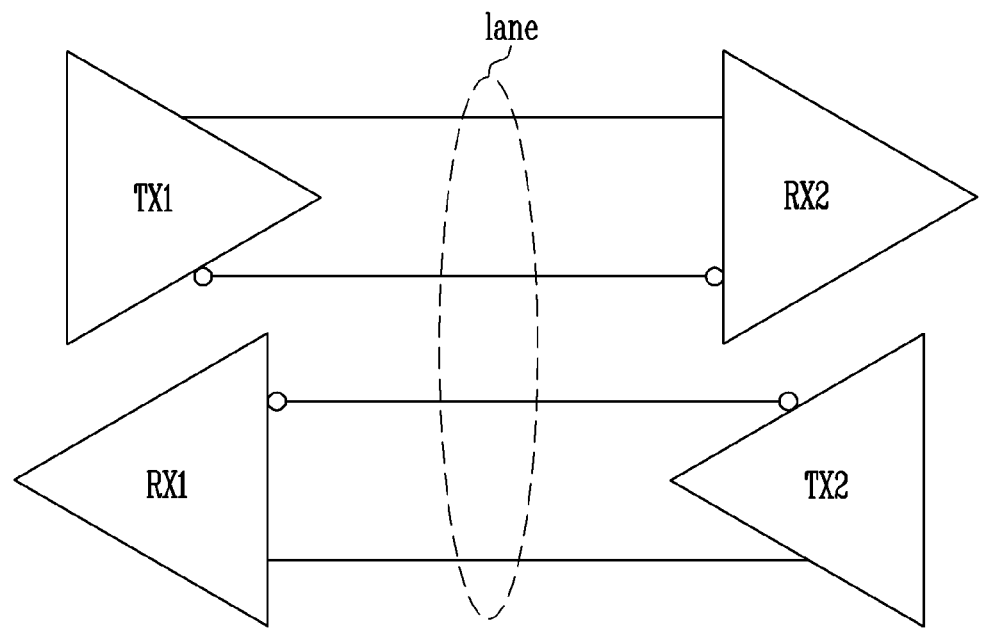
FIG. 4 is a diagram illustrating a transmitter, a receiver, and a lane in accordance with an embodiment of the present disclosure.

FIG. 4 is a diagram illustrating a transmitter, a receiver, and a lane in accordance with an embodiment of the present disclosure.

Referring to FIG. 4, a first transmitter TX1, a second transmitter TX2, a first receiver RX1, and a second receiver RX2 are illustrated. A lane may include a path including differentially driven signal pairs, e.g., a transmission path pair configured for transmission and a reception path pair configured for reception. A PCIe device may include a transmission logic for transmitting data to another PCIe device and a reception logic for receiving data from another PCIe device. For example, the lane may include two transmission paths connected to the first transmitter TX1 and two reception paths connected to the first receiver RX1.

The transmission path may mean an arbitrary path for transmitting data, such as a transmission line, a copper line, an optical line, a wireless communication channel, an infrared communication link, or another communication path. In addition, the reception path may be a path which is implemented identically to the transmission path, but is used for reception.

Connection between two PCIe devices, e.g., the first PCIe device 200-1 and the second PCIe device 200-2 may be designated as a link. The link may support one or more lanes. For example, the link may include a plurality of lanes.

Figure 5:
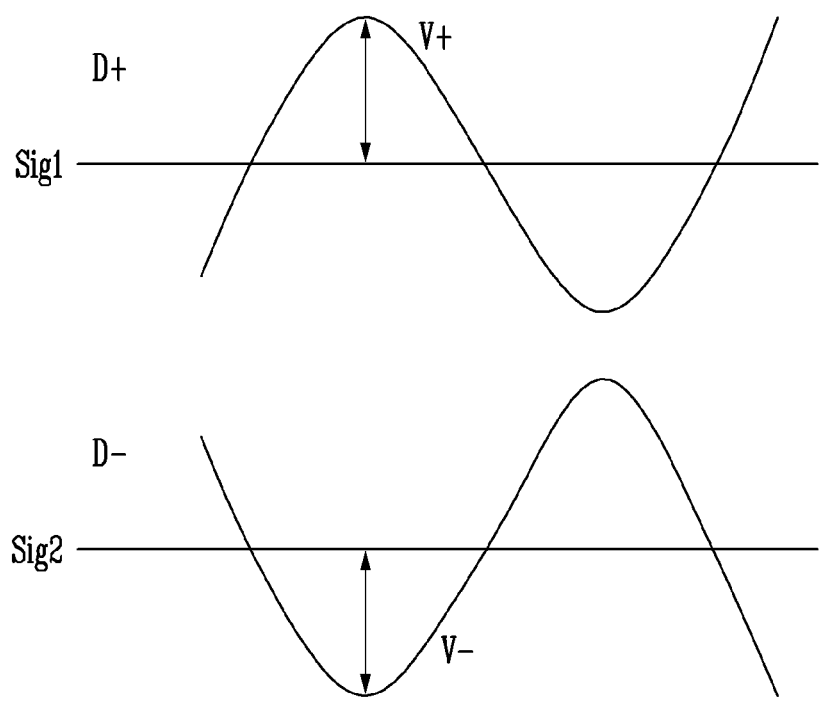
FIG. 5 is a diagram illustrating a differential signal in accordance with an embodiment of the present disclosure.

FIG. 5 is a diagram illustrating a differential signal in accordance with an embodiment of the present disclosure.

Referring to FIG. 5, one differential signal is illustrated. A PCIe device may use a differential signal for the purpose of transmission. Also, the PCIe device may use a differential signal for the purpose of reception. The differential signal may mean signal pairs which have the same frequency and the same amplitude but have phases opposite to each other. For example, when a first signal is at a rising edge at which the first signal is toggled from 0 to V+, a second signal may be at a falling edge at which the second signal is toggled from 0 to V−. The PCIe device can use signal integrity, e.g., more satisfactory electrical characteristics such as cross-coupling, voltage overshoot/undershoot, and ringing, by using the differential signal. The PCIe device can more rapidly adjust a transmission frequency. Also, the link may include a plurality of lanes to adjust a bandwidth. For example, two PCIe devices may form a link including 1 lane, 2 lanes, 4 lanes, 8 lanes, 12 lanes, 32 lanes, 64 lanes, or the like.

Figure 6:
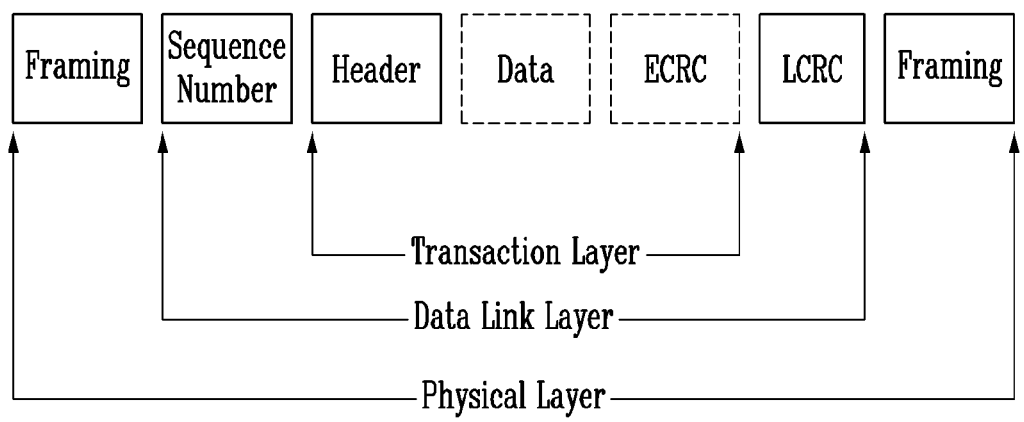
FIG. 6 is a diagram illustrating a configuration of a packet in accordance with an embodiment of the present disclosure.

FIG. 6 is a diagram illustrating a configuration of a packet in accordance with an embodiment of the present disclosure.

Referring to FIG. 6, each component of the packet 50 may be sequentially processed in each layer of the PCIe interface. Specifically, the packet 50 may configured with different protocols in a form processed in each layer. For example, a transaction layer packet (TLP) may be generated and processed in the transaction layer 211-1 or 211-2. The TLP may include a header field, a data field, and an end-to-end cyclic redundancy check (ECRC) field. The header field may be a field including a type of the TLP, information on whether data is to be included, information on whether a cyclic redundancy check (CRC) is to be included, and the like. In addition, the data field may be a field including data to be transmitted or received, and the ECRC field may be a field including an ECRC value representing information on an endpoint. Meanwhile, the data field and the ECRC field may not be included in the TLP.

In addition, a data link layer packet (DLLP) may be generated and processed in the data link layer 212-1 or 212-2. The DLLP may further include a sequence number field and a link cyclic redundancy check (LCRC) field in addition to the TLP. The sequence number field may be a field including information on a sequence number of the TLP, and the LCRC field may be a field including information on an LCRC.

In addition, a physical layer packet (PLP) may be generated and processed in the physical layer 213-1 or 213-2. The PLP may further include a framing field in addition to the DLLP. The framing field may be a field including information on a serialized format.

Figure 7:
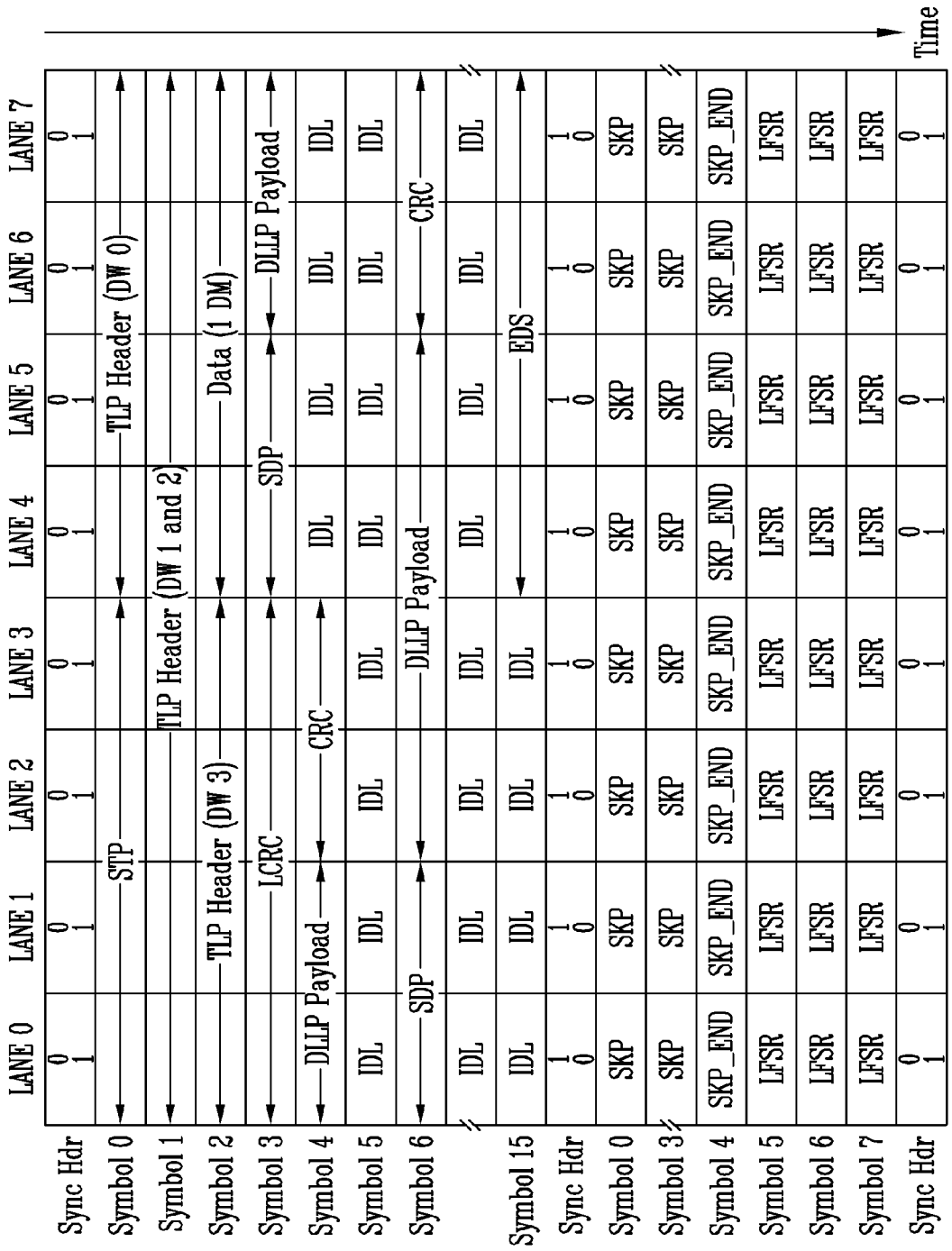
FIG. 7 is a diagram illustrating a data stream in accordance with an embodiment of the present disclosure.

FIG. 7 is a diagram illustrating a data stream in accordance with an embodiment of the present disclosure.

Referring to FIG. 7, a data stream transmitted through an x8 link is illustrated. The data stream may include transmission of a SKIP Ordered Set (SKP OS).

The data stream may start from transmission of a sync header Sync Hdr H1H=10b, which represents a data block. Therefore, a start of TLP (STP) framing token may be transmitted as a zeroth symbol representing the start of a TLP stream in lane 0 to lane 3. In addition, a TLP header and TLP data may be transmitted as a first symbol and a second symbol. A link cyclic redundancy check (LCRC) may be transmitted posterior to the TLP data, an SDP header representing that DLLP data is to be transmitted posterior to the LCRC may be transmitted as a third symbol. In addition, cyclic redundancy check (CRC) data may also be provided in relation to the DLLP data.

Subsequently, a logical idle token (IDL) representing that no data is transmitted through the link may be transmitted. In addition, an EDS token may be transmitted to represent that data is changed to SKP OS data on the lane. For example, another sync data may be transmitted, which is encoded as "01b" representing that a subsequent block is to be an SKP OS data block.

An SKP OS may include a parity bit representing a parity state for each of lanes (e.g., zeroth to seventh lanes) of the link. The SKP OS may further include a layout defined to be identified by a receiver. For example, the SKP OS may include 16 basic symbols in the case of 128*b*/130*b* encoding in PCIe. Four SKP symbol groupings may be added or removed by a port, and the SKP OS may include 8 symbols, 12 symbols, 16 symbols, 20 symbols, 24 symbols, or the like. In addition, as shown in FIG. 7, an SKP_END symbol may be provided to represent an end position of the SKP OS on the lane and a position of a next block sync header transmitted through the lane.

Figure 8:
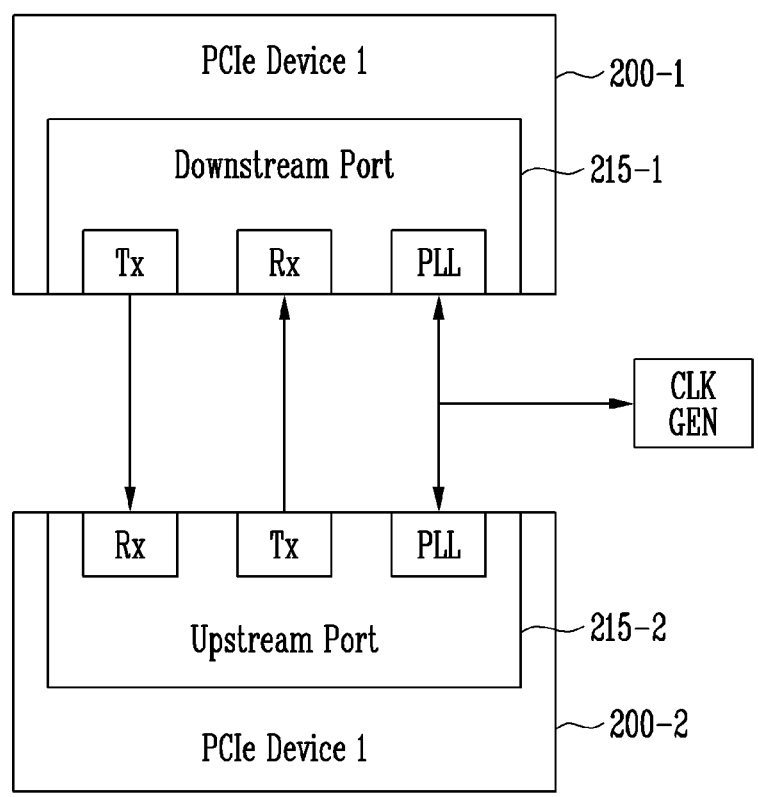
FIG. 8 is a diagram illustrating a port in accordance with an embodiment of the present disclosure.

FIG. 8 is a diagram illustrating a port in accordance with an embodiment of the present disclosure.

Referring to FIG. 8, a downstream port 215-1 and an upstream port 215-2 are illustrated, which are respectively included in a first PCIe device 200-1 and a second PCIe device 200-2.

In an embodiment, the first PCIe device 200-1 may be an upper layer than a layer of the second PCIe device 200-2, and data movement and transmission to an upper layer may be designated as upstream. On the contrary, data movement and transmission to a lower layer may be designated as downstream. For example, referring to FIG. 1, the switch 140 may support routing of the upstream and the downstream. Specifically, the upstream may be routing of a packet or message upstream to a layer toward the root complex 120 from a PCIe endpoint (e.g., 150_1), and the downstream may be routing of a packet or message downstream to a layer toward a PCIe endpoint (e.g., 150_2) from the root complex 120.

In an embodiment, the first PCIe device 200-1 including the downstream port 215-1 may be designated as an "upstream component." The upstream component may represent the root complex 120 or the switch 140, which is shown in FIG. 1. In addition, the second PCIe device 200-2 including the upstream port 215-2 may be designated as a "downstream component." The downstream component may represent one of the switch 140, the PCIe endpoints 150_1 to 150_3, the legacy endpoints 160_1 and 160_2, and the PCIe bridge 170, which are shown in FIG. 1.

Each of the downstream port 215-1 and the upstream port 215-2 may include a transmitter Tx, a receiver Rx, and a phase locked loop (PLL) circuit. The PLL circuit may generate a clock signal to be supplied to the transmitter Tx or the receiver Rx by using a clock signal provided from a clock signal generator CLK GEN. The PLL circuit may generate a clock signal with a changed frequency by multiplying a signal received from the clock signal generator CLK GEN. For example, the PLL circuit may multiply a reference clock signal REFCLK having a frequency of 100 MHz into a clock signal having a frequency of 2.5 GHZ. The transmitter Tx may convert a parallel data signal into a serial data signal by using an output signal of the PLL circuit, and transmit the serial data signal to the external device, e.g., an external PCIe device. The receiver Rx may receive a serial data signal transmitted from the external device, and generate a clock signal for recovering the received serial data signal and a clock signal for converting the recovered serial data signal into a parallel data signal by using the output signal of the PLL circuit. The clock signal generator CLK GEN may generate a reference clock signal used for an operation of a PCIe interface. The operation of the PCIe interface may be communication with the external PCIe device.

Figure 9:
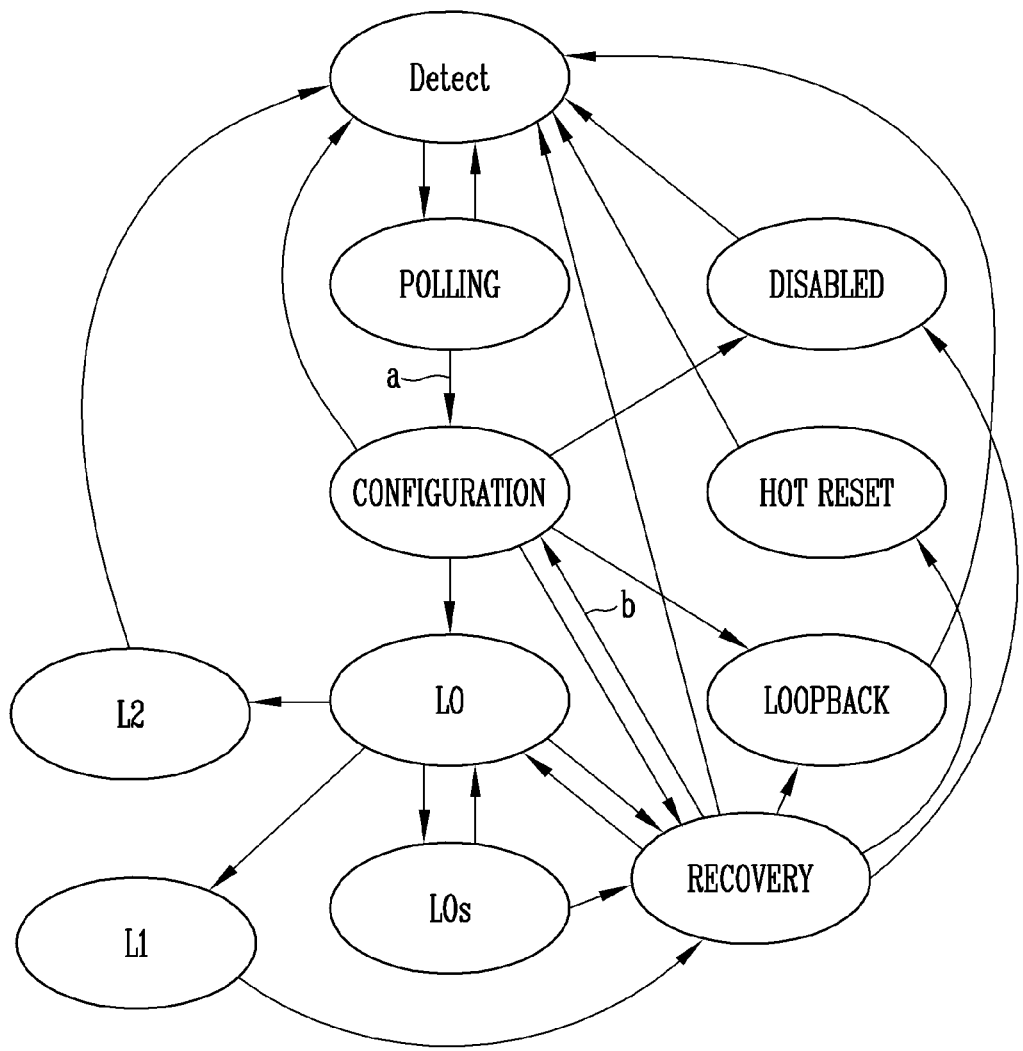
FIG. 9 is a diagram illustrating a link state of the PCIe device in accordance with an embodiment of the present disclosure.

FIG. 9 is a diagram illustrating a link state of the PCIe device in accordance with an embodiment of the present disclosure.

Referring to FIG. 9, link states of the PCIe device include a detect state, a polling state, a configuration state, a hot reset state, a disabled state, an L0 state, an L0s state, an L1 state, an L2 state, and the like. More specifically, FIG. 9 illustrates an operational configuration of a Link Training and Status State Machine (LTSSM).

The detect state is an initialization state after power-on or a reset, and the state of a link enters into the detect state from the following states. For example, the detect state may be a state in which the state of the link enters into the detect state from the configuration state, the hot reset state, the disabled state, the L2 state, a loopback state, and a recovery state. The detect state may reset all logics, all ports, and all registers, and be a phase of detecting a link connected to the PCIe interface. That is, the detect state may be a phase of searching from a physically connected lane.

The polling state may mean a state for distinguishing a lane through which data communication is possible among detected lanes. The polling state may be a phase of synchronizing clocks at both ends of the PCIe interface, checking whether the polarity of the lane is D+ or D−, and checking a data transmission speed which the lane can use. That is, the polling state may be a state for checking polarity inversion. In addition, the link in the polling state may enter into the detect state or the configuration state.

The configuration state may be a state for checking a connection state of a lane. Specifically, the configuration state may be a state for defining a lane width with which data communication is possible. Also, the configuration state may be a state for checking lane inversion. The configuration state may be a state in which the state of a link enters into the configuration state from the polling state. Alternatively, the state of the link may enter into the L0 state and then enter into the configuration state in lane reduce and lane width up.

The recovery state may be a state used for reconfiguration of a link bandwidth. The recovery state may change the link bandwidth of a set link, and reset a bit lock, a symbol lock, and a lane-to-lane de-skew. The state of the link may enter into the recovery state when an error occurs in the L0 state. Subsequently, the state of the link may be changed from the recovery state to the L0 state after the error is recovered in the recovery state. In accordance with an embodiment of the present disclosure, an equalization operation of the link may be performed in the recovery state.

The L0 state may be a normal operational state in which data and packets can be transmitted and received through a link. Specifically, the L0 state may be an operational state of a physical bus interface through which data and control packets can be transmitted and received. The L0 state may be a fully active state.

The L0s state may be a state which enables the physical bus interface to rapidly enter into a power preservation state and enables the physical bus interface to be recovered without going through any recovery state. The L0s state may be a power saving state. The L0s state may be an idle or standby state of some functions in the interface.

The L1 state may be a power saving state. The L1 state may be a state in which a power saving amount is added as compared with the L0s state. The L1 state may be a low power standby state.

The L2 state may be an active power saving state. Most transmitters and receivers may be shut off. Main power and clocks are not guaranteed, but auxiliary power may be supplied. The L2 state may be a lower power sleep state in which no power is supplied to most functions. The loopback state may be a state used for test and malfunction separation. The loopback state is operated only in units of lanes, and a loopback reception lane is to be selected and configured.

The disabled state may be a state which disables a set link until further notice. The hot reset state may be triggered by only a downstream port. The downstream port may use training sequences (e.g., TS1 or TS2) to propagate a hot reset. The training sequences (TS) may be aligned sets used for initializing bit alignment, symbol alignment, and physical layer parameter exchange. In this specification, the "training sequences" may be designated as "training sequence ordered sets."

Figure 10:
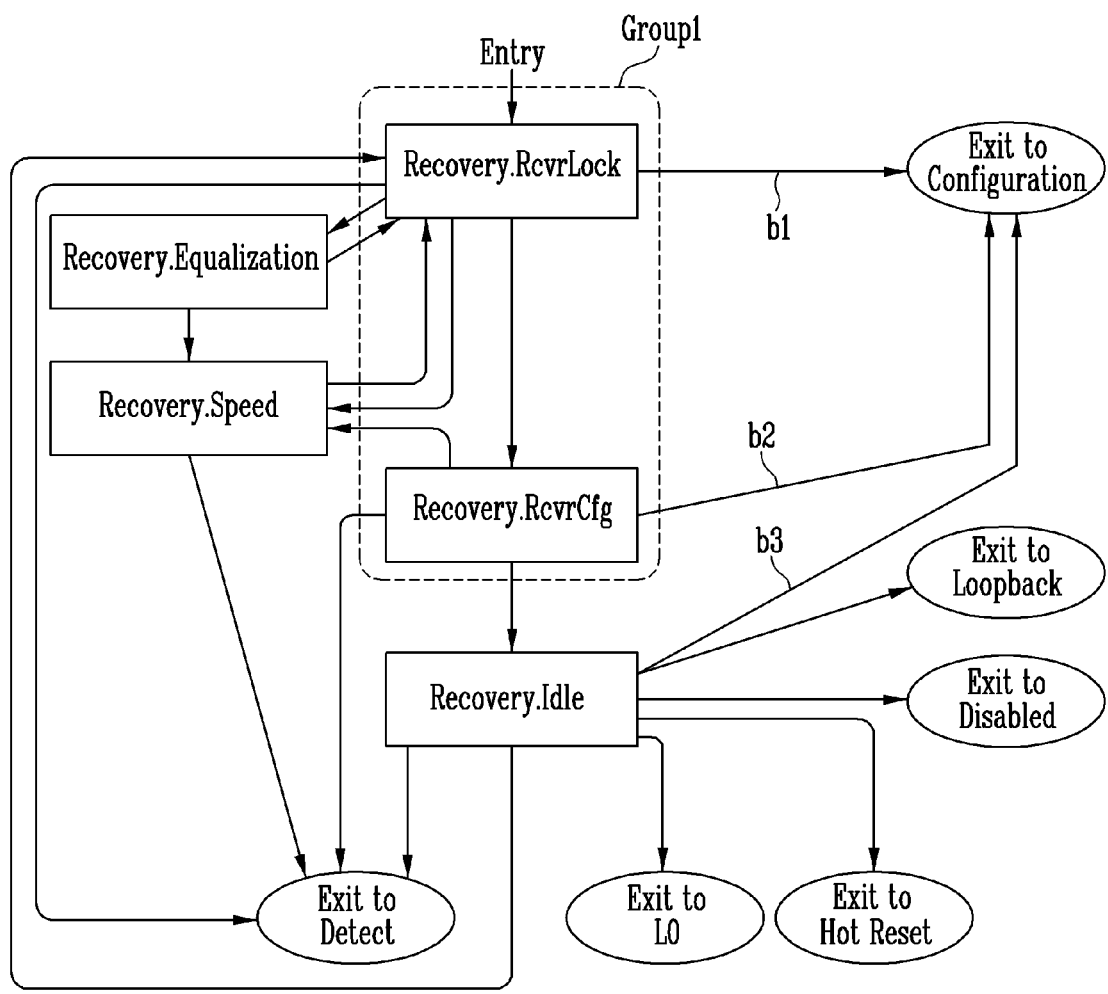
FIG. 10 is a diagram illustrating detailed sub-states of a recovery state shown in FIG. 9 in accordance with an embodiment of the present disclosure.

FIG. 10 is a diagram illustrating detailed sub-states of a recovery state shown in FIG. 9 in accordance with an embodiment of the present disclosure. Specifically, FIG. 10 illustrates an operation of a sub-state machine in the recovery state.

(1) Recovery.RcvrLock

When a link is operated at a data speed of 8.0 GT/s or higher, a receiver is to consider that a TS1 or TS2 ordered set will be received only after block alignment is acquired in a corresponding lane. When an item of the Recovery.RcvrLock sub-state is started in Recovery.Speed or L0s, the block alignment is to be acquired after an electrical idle condition is ended. When the item of this sub-state is started in L0, the block alignment is to be acquired after a last data stream is ended.

(2) Recovery.Equalization

A transmitter escapes from the configuration state and then transmits the TS1 ordered set in all lanes configured using the link and a lane number.

(3) Recovery.Speed

The transmitter enters into the electrical idle condition and maintains the condition until receiver lanes become the electrical idle condition. Subsequently, the transmitter additionally maintains the state for a minimum of 800 ns in a next successful speed negotiation (e.g., success_speed_negotiation=1b) or a minimum of 6 μs in a next failed speed negotiation (e.g., success_speed_negotiation=0b), but does not stay for 1 ms or more. An operating frequency may be changed to a new data speed only after the receiver lane enters into the electrical idle condition.

(4) Recovery.RcvrCfg

The transmitter exits from the configuration state and then sends the TS2 ordered set to all lanes configured using the same set line and the same set lane number. When a directed_speed_change variable is already set to 1b, a speed_ change bit (bit 7 of a data speed identifier symbol in the TS2 ordered set) is to be set as 1b. An N_FTS value of the transmitted TS2 ordered set is to reflect a number at a current data speed.

(5) Recovery.Idle

In the Recovery.Idle sub-state, the state of the link proceeds to any one state among the Recovery.RcvrLock sub-state, the detect state of the LTSSM, the hot reset state of the LTSSM, the L0 of the LTSSM, the loopback state of the LTSSM, and the configuration state of the LTSSM according to directions.

In accordance with the present disclosure, the Recovery.RcvrLock sub-state and the Recovery.RcvrCfg sub-state are sub-states belonging to a first group Group1.

Figure 11:
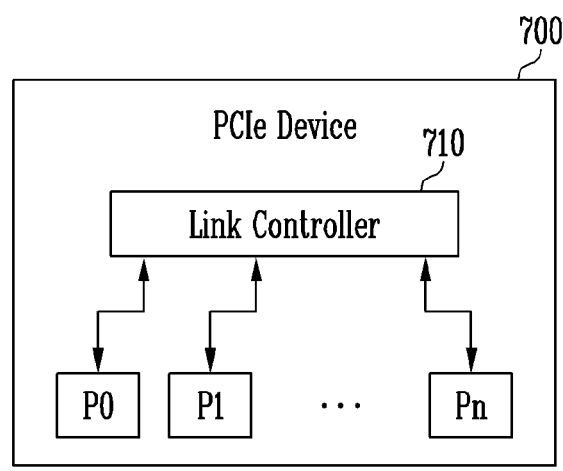
FIG. 11 is a diagram illustrating a PCIe device in accordance with an embodiment of the present disclosure.

FIG. 11 is a diagram illustrating a PCIe device in accordance with an embodiment of the present disclosure.

Referring to FIG. 11, the PCIe device 700 may include a plurality of ports P0 to Pn and a link controller 710.

The plurality of ports P0 to Pn may form a plurality of lanes. For example, as shown in FIG. 4, one port along with a port included in another PCIe device may form one lane. In an embodiment, each of the plurality of ports P0 to Pn may be a downstream port or an upstream port. For example, when the plurality of ports P0 to Pn are downstream ports, the PCIe device 700 may be an upstream component. Also, when the plurality of ports P0 to Pn are upstream ports, the PCIe device 700 may be a downstream component. Each of the plurality of ports P0 to Pn may include a receiver and a transmitter.

The link controller 710 may set a link. The link may include the plurality of ports P0 to Pn. That is, the link may be formed by the plurality of ports P0 to Pn. For example, the link controller 710 may perform a link setting operation of setting a link. The link setting operation may represent a process of initializing and configuring a link such that the link normally operates. The link setting operation constitutes a link initialization and training operation according to a PCIe specification.

In an embodiment, the link controller 710 may include a Link Training and Status State Machine (LTSSM). The LTSSM may be a component for performing the link setting operation.

The link controller 710 may perform a link width and lane number negotiation operation. A link width may represent a number of lanes forming a link. For example, the link controller 710 may determine a link width in a process of setting a link. A lane number may represent a number allocated to each lane included in a link. For example, the link controller 710 may negotiate a number allocated to each lane in a process of setting a link, and determine a line number of each lane according to the negotiation. The determined lane number may be transmitted to another PCIe device, and the another PCIe device may accept the corresponding lane number.

The link controller 710 may detect a fail lane among a plurality of lanes in a process of setting a link. The fail lane may be a lane which has a state in which the fail lane along with the other lanes cannot form the link. The other lanes are lanes which are not fail lanes, and may include all lanes except the fail lane among the plurality of lanes. For example, when a problem occurs in a transmission path or a reception path, which is included in a lane, the corresponding lane may be a fail lane. The fail lane may not normally operate when data is transmitted. For example, when the state of the link is a detect state, the link controller 710 may detect a fail lane through a line setting operation corresponding to the detect state. The link setting operation corresponding to the detect state is an operation performed to set a line in the detect state, and may include an operation for finding a link at both ends. For example, the both ends may be ports included in different PCIe devices connected to each other through the link. Subsequently, the link controller 710 may perform a link setting operation corresponding to the detect state on the other lanes except the fail lane among the plurality of lanes. Also, when the state of a link is a polling state, the link controller 710 may detect a fail lane through a link setting operation corresponding to the polling state. The link setting operation corresponding to the polling state is an operation performed to set a link in the polling state, and may include an operation of transmitting/receiving a training sequence ordered set. For example, the link setting operation corresponding to the polling state may include an operation of transmitting/receiving a training sequence ordered set between ports connected through the link. Subsequently, the link controller 710 may perform a link setting operation corresponding to the polling state on the other lanes.

In an embodiment, the link controller 710 may set a link to have a link width including at least one lane among the other lanes except the fail lane. For example, when the state of a link is a configuration state, the link controller 710 may perform a link setting operation corresponding to the configuration state on the other lanes. The link setting operation corresponding to the configuration state may be an operation performed to set a link in the configuration state. For example, the link setting operation corresponding to the configuration state may include an operation of setting a link width, an operation of determining a lane number, a lane to lane de-skew operation, and the like.

For example, the link controller 710 may determine a link number of the link in the configuration state, and determine a lane number of each of the other lanes. The link controller 710 may determine a lane number of each of the other lanes through a lane number negotiation operation. In an embodiment, the link controller 710 may determine a lane number of each of the other lanes such that the lane numbers of the other lanes sequentially increase or decrease.

In an embodiment, the link controller 710 may provide a link number determined through the plurality of ports P0 to Pn and the determined lane number of each of the other lanes to other ports forming a plurality of lanes together with the plurality of ports P0 to Pn. The other ports may be ports included in another PCIe device different from the PCIe device 700. For example, the link controller 710 may provide the other ports with a link number determined by using the training sequence ordered set and the determined lane number of each of the other lanes. Another PCIe device may accept the link number and the lane number of each of the other lanes.

Figure 12A:
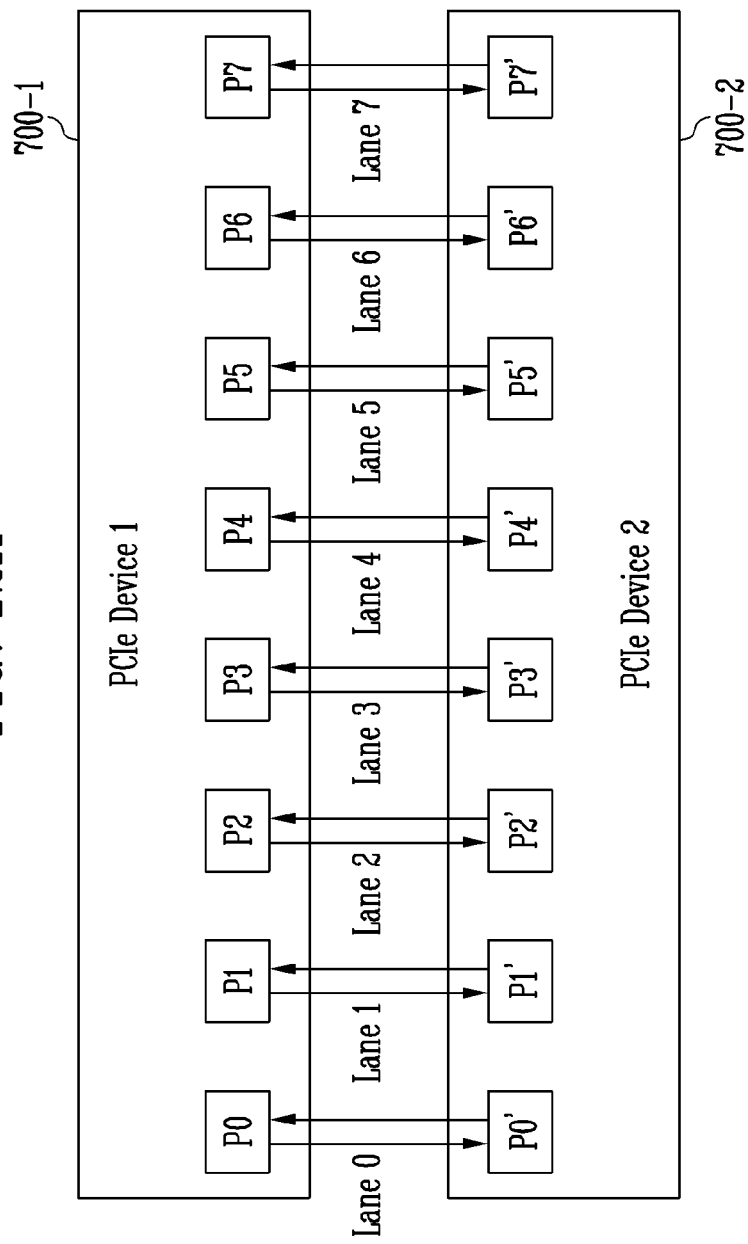
FIGS. 12A and 12B are diagrams illustrating an operation of setting a link in accordance with an embodiment of the present disclosure.
Figure 12B:
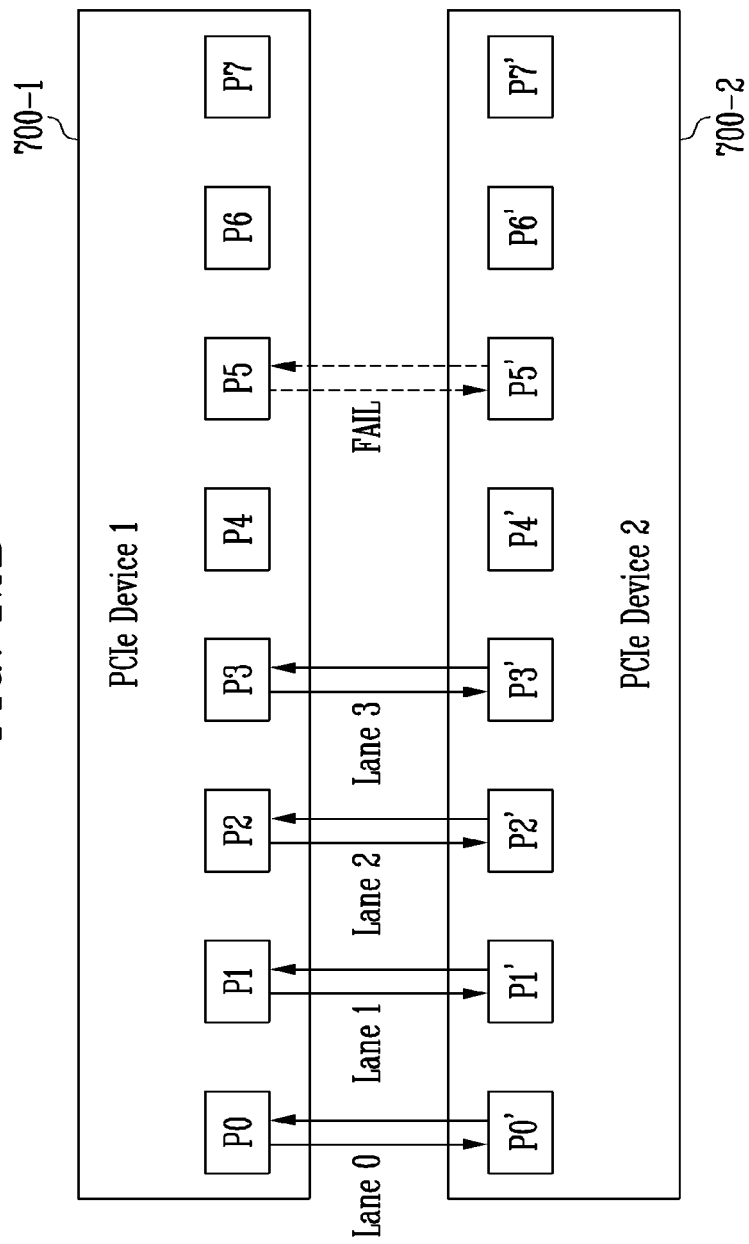

FIGS. 12A and 12B are diagrams illustrating an operation of setting a link in accordance with an embodiment of the present disclosure.

Referring to FIG. 12A, each of a first PCIe device 700-1 and a second PCIe device 700-2 may represent the PCIe device 700. For example, the first PCIe device 700-1 may be a PCIe device including a plurality of downstream ports P0 to P7. In addition, the second PCIe device 700-2 may be a PCIe device including a plurality of upstream ports P0' to P7'. However, this is merely an example. In some embodiments, the ports included in the first PCIe device 700-1 may be upstream ports, and the ports included in the second PCIe device 700-2 may be downstream ports. In some embodiments, the first PCIe device 700-1 may include downstream ports, and the second PCIe device 700-2 may include upstream ports. In addition, although it is illustrated that each of the first PCIe device 700-1 and the second PCIe device 700-2 includes 8 ports, the number of ports may vary in some embodiments.

The plurality of downstream ports P0 to P7 along with the plurality of upstream ports P0' to P7' may form a plurality of lanes. For example, a zeroth downstream port P0 and a zeroth upstream port P0' may form a zeroth lane Lane 0, a first downstream port P1 and a first upstream port P1' may form a first lane Lane 1, a second downstream port P2 and a second upstream port P2' may form a second lane Lane 2, a third downstream port P3 and a third upstream port P3' may form a third lane Lane 3, a fourth downstream port P4 and a fourth upstream port P4' may form a fourth lane Lane 4, a fifth downstream port P5 and a fifth upstream port P5' may form a fifth lane Lane 5, a sixth downstream port P6 and a sixth upstream port P6' may form a sixth lane Lane 6, and a seventh downstream port P7 and a seventh upstream port P7' may form a seventh lane Lane 7. The operation of forming these lanes may be performed through a link width and lane number negotiation operation.

FIG. 12B illustrates a case where the lane between the fifth downstream port P5 and the fifth upstream port P5' is a fail lane while the first PCIe device 700-1 and the second PCIe device 700-2 set a link.

The first PCIe device 700-1 may perform a lane number negotiation operation on the plurality of ports P0 to P7 in an order in which port numbers of the plurality of ports P0 to P7 increase. Therefore, according to the PCIe specification, since the lane between the fifth downstream port P5 and the fifth upstream port P5' is a fail lane, the lane number negotiation operation on the sixth downstream port P6 and the seventh downstream port P7 may not be performed. The lane between the sixth downstream port P6 and the sixth upstream port P6' and the lane between the seventh downstream port P7 and the seventh upstream port P7' may be in an electrical idle condition.

In addition, according to the PCIe specification, a link width may be generally determined as one of 1 lane, 2 lanes, 4 lanes, 8 lanes, 12 lanes, 16 lanes, and 32 lanes. Therefore, the first PCIe device 700-1 may set a link to have a link width including 4 lanes Lane 0 to Lane 3. The link may be formed with only 4 lanes Lane 0 to Lane 3. Although the lane between the fourth downstream port P4 and the fourth upstream port P4' is not a fail lane, the lane between the fourth downstream port P4 and the fourth upstream port P4' may be in an electrical idle condition.

When a link error occurs in a state in which a PCIe link is being operated, an action on the link error is configured with adjustment of an operation speed or a change in configuration (link width and lane number) of the link. These two operations may be simultaneously performed. In addition, any method capable of determining and sorting in detail a direct cause of the link error does not exist in terms of a PCIe protocol. Therefore, when a link error occurs, a link speed is primarily adjusted downward, and a link configuration is secondarily changed.

According to the process described above, the link speed is necessarily primarily lowered to change the link configuration. Therefore, when the cause of the link error is caused by the link configuration instead of the link speed, performance deterioration consequently occurs due to an unnecessary downward link speed.

Referring to FIGS. 9 and 10, the following four cases in which the state of the link enters into the configuration state exist.

(1) Polling→Configuration

This is a case where the state of the link enters into the configuration state to perform a specific lane configuration (link width identification and lane number specification), after a list of primary active lanes is identified (indicated by a in FIG. 9). The case is a process which is essentially performed in an initialization process of the link, and does not correspond to the case which is problematic in the present disclosure.

(2) Recovery→Configuration

This is a case where the state of the link enters into the configuration state from the recovery state (indicated by b in FIG. 9). Meanwhile, a case where the state of the link enters into the configuration state among specific sub-states included in the recovery state will be examined in detail.

(2-1) Recovery.RcvrLock→CONFIGURATION

In a situation in which a specific data rate is applied, a timeout of 24 ms occurs when transmission/reception of a normal packet is impossible. Subsequently, the data rate is adjusted toward to 2.5 GT/s. This is a numerical value corresponding to the lowest performance with which the PCIe link can be operated. That the link speed is lowered to the lowest numerical value is a result that a cause of a current link error results from "high performance" and accordingly, primarily attempting a decrease in performance. When the link error is continued even when the performance is adjusted downward, it is finally determined that the configuration of the link itself is problematic, thereby finally entering into the configuration state (indicated by b1 in FIG. 10).

The case where the transmission/reception of the normal packet is impossible may mean a case where values of a lane number or link number on a packet transmitted to each lane are not normally matched.

(2-2) Recovery.RcvrCfg→CONFIGURATION

Like the previous (2-1) case b1, this is a case occurring when transmission/reception of a normal packet is impossible (indicated by b2 in FIG. 10). In the Recovery.RcvrCfg sub-state, completion is possible only when a packet TS2 in which the link and the lane number are normally matched is to be transmitted/received. If not, the Recovery.RcvrCfg sub-state finally enters into the configuration state only when the data rate is 2.5 GT/s.

(2-3) Recovery.Idle→CONFIGURATION

This is a case where, when a host is to arbitrarily change the configuration of a corresponding link, the state of the link enters into the configuration state according to a request of a host, thereby changing a link configuration (indicated by b3 in FIG. 10). This is a process which is irrelevant to an occurrence of a link error and may be performed when a change in link width, or the like is necessary even in a period in which a normal operation is maintained.

Therefore, the case where "occurrence of performance deterioration due to adjustment of an unnecessary lowest data rate," which is problematic, is checked among the above four cases corresponds to the cases indicated by b1 and b2. When the link speed is a cause of the link error, a problem is not to be checked any more after the link speed is adjusted downward. Hence, the case does not enter into the configuration state. Consequently, a situation in which the state of the link finally enters into the configuration state means a link error irrelevant to the link speed. Therefore, the link speed may be preferably recovered to a highest numerical value after the link error is solved through a change in link configuration.

The host has authority of changing a link speed with respect to a PCIe basic specification, and controls the link speed through a speed change variable. The speed change variable may be a directed_speed_change variable. The directed_speed_change variable has a value of 0b in reset. In the existing LTSSM regulation, with respect to all of the above four cases, "directed_speed_change=0b" is reset. Therefore, even in the cases indicated by b1 and b2, the final speed still maintains the lowest numerical value (2.5 GT/s) after the configuration state is ended.

In accordance with an embodiment of the present disclosure, by setting "directed_speed_change=1b" with respect to the above cases indicated by b1 and b2, the maximum link speed can be applied from the beginning when the state of the link again enters into the recovery state after the configuration state is performed. Accordingly, when the cause of the occurrence of the link error is not the link speed, the link speed can be recovered to the highest numerical value. As shown in FIG. 10, the Recovery.RcvrLock sub-state and the Recovery.RcvrCfg sub-state are sub-states belonging to the first group Group1. That is, in accordance with an embodiment of the present disclosure, in entrance into the configuration state from sub-states belonging to the first group Group1 among sub-states in the recovery state, any value of the speed change variable is not reset. Accordingly, in the cases indicated by b1 and b2, the link speed can be recovered to the highest numerical value.

FIG. 13 is a flowchart illustrating an operating method of a configuration state in accordance with an embodiment of the present disclosure.

Referring to FIG. 13, an embodiment of the configuration state among the states included in the LTSSM shown in FIG. 9 is illustrated. Specifically, after the state of a link enters into a configuration state (S110), it is determined whether the entrance of the state of the link into the corresponding configuration state is entrance of the state of the link into the configuration state from a sub-state of a first group among the sub-states of the recovery state (S120). As described above, the sub-state of the first group includes at least one of the Recovery.RcvrLock sub-state and the Recovery.RcvrCfg sub-state. When the state of the link enters into the configuration state from the sub-state of the first group (S120: YES), this corresponds to the above-described case indicated by b1, and therefore, the speed change variable is set to a second value (S150). In the operation S150, the speed change variable may be a directed_speed_change variable, and the second value may be "1b."

When the state of the link does not enter into the configuration state from the sub-state of the first group (S120: NO), this means that the entrance into the corresponding configuration state does not belong to any of the above-described cases indicated by b1 and b2. That is, the entrance into the corresponding configuration state will correspond to the case indicated by a or b3. Therefore, the speed change variable is set to a first value (S140). In the operation S140, the speed change variable may be a directed_speed_change variable, and the first value may be "0b."

Since the directed_speed_change variable is completely set, detailed operations of the configuration state are subsequently performed (S160). Although not shown in detail in FIG. 13, when the operation S160 is completely performed, the state of the link may escape from the configuration state and then enter into the L0 state as shown in FIG. 9.

Figure 14:
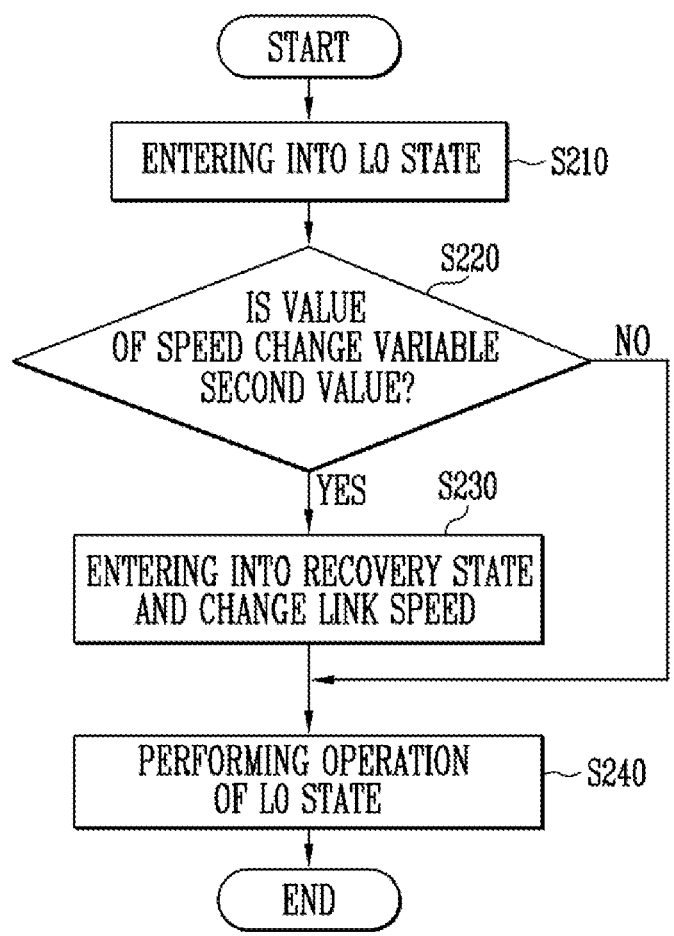
FIG. 14 is a flowchart illustrating an operating method of an L0 state in accordance with an embodiment of the present disclosure.

FIG. 14 is a flowchart illustrating an operating method of an L0 state in accordance with an embodiment of the present disclosure.

Referring to FIG. 14, an embodiment of the L0 state among the states included in the LTSSM shown in FIG. 9 is illustrated. Specifically, an operation when the state of a link enters into an L0 state from the configuration state is illustrated in FIG. 14.

After the state of the link enters into the L0 state (S210), it is determined whether the value of the speed change variable is the second value (S220). In the operation S210, it is determined whether the value of the directed_speed_change variable is 1b. When the value of the speed change variable is the second value, i.e., when the value of the speed change variable is 1b (S220: YES), the state of the link enters into the recovery state, and the link speed is changed (S230). Since the value of the directed_speed_change variable is 1b, the link speed may be changed to the existing maximum speed. Subsequently, an operation of the L0 state is performed (S240).

When the value of the speed change variable is the first value instead of the second value, i.e., when the value of the speed change variable is 0b (S220: NO), the operation of the L0 state is performed (S240). Since the value of the directed_speed_change variable is 0b, the link speed may be maintained as the lowest numerical value (2.5 GT/s).

As described above, in accordance with the embodiment of the present disclosure, the value of the speed change variable is adaptively set according to a cause of entrance into the configuration state in the LTSSM. Thus, a case where the link speed is unnecessarily adjusted downward to the lowest value can be prevented. Accordingly, the operational speed of the PCIe device can be entirely improved.

Figure 15:
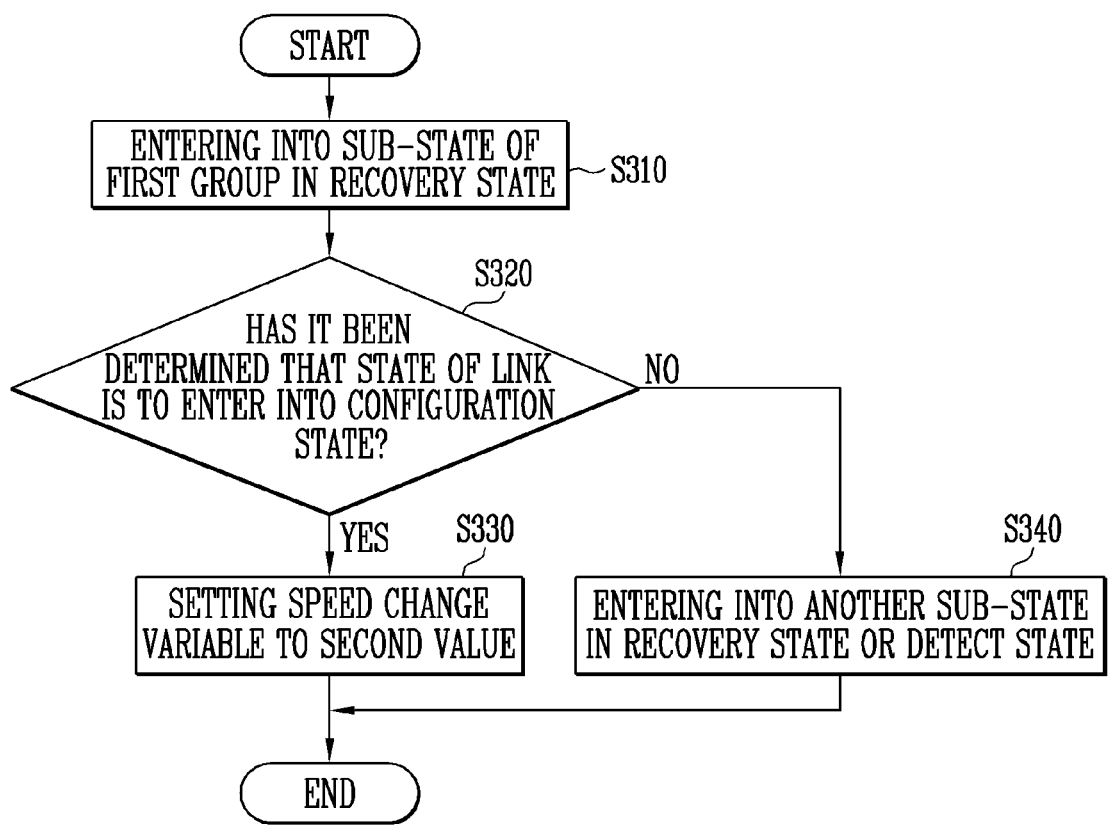
FIG. 15 is a flowchart illustrating an operating method of a recovery state in accordance with another embodiment of the present disclosure.

FIG. 15 is a flowchart illustrating an operating method of a recovery state in accordance with another embodiment of the present disclosure. In FIG. 15, an embodiment of a sub-state included in a first group among sub-states included in the recovery state is illustrated. In the embodiment shown in FIG. 13, the value of the speed change variable, i.e., the directed_speed_change variable is set from the viewpoint of the configuration state. However, in the embodiment shown in FIG. 15, the value of the speed change variable, i.e., the directed_speed_change variable is set from the viewpoint of the recovery state before entrance into the configuration state.

Referring to FIG. 15, first, the state of a link enters into a sub-state of a first group in the recovery state (S310). The sub-state of the first group in the recovery state may be the Recovery.RcvrLock sub-state or the Recovery.RcvrCfg sub-state. After the state of the link enters into the sub-state of the first group, it is decided whether it has been determined that the state of the link is to enter into the configuration state (S320). When it is determined that the state of the link is to enter into the configuration state (S320: YES), this corresponds to the case indicated by b1 or b2, and therefore, the speed change variable is set to the second value (S330). For example, in the operation S330, the directed_speed_change is set to 1b.

When it is not determined that the state of the link is to enter into the configuration state (S320: NO), the state of the link enters into another sub-state in the recovery state or the detect state (S340). When the sub-state of the first group, into which the state of the link enters in the operation S310, is the Recovery.RcvrLock sub-state, as shown in FIG. 10, the state of the link enters into the Recovery.RcvrCfg sub-state from the Recovery.RcvrLock sub-state, enters into the Recovery.Equalization sub-state from the Recovery.RcvrLock sub-state, enters into Recovery.Speed sub-state from the Recovery.RcvrLock sub-state, or enters into the detect state from the Recovery.RcvrLock sub-state when the state of the link does not enter into the configuration state. That is, when it is not determined that the state of the link enters into the configuration state (S320: NO), the state of the link enters into another sub-state (e.g., the Recovery.RcvrCfg sub-state, Recovery.Equalization sub-state, or the Recovery.Speed sub-state) in the recovery state or the detect state (S340). The directed_speed_change variable is not set to 1b.

In another example, when the sub-state of the first group, into which the state of the link enters in the operation S310, is the Recovery.RcvrCfg sub-state, as shown in FIG. 10, the state of the link enters into the Recovery.Idle sub-state from the Recovery.RcvrCfg sub-state, enters into the Recovery.Speed sub-state from the Recovery.RcvrCfg sub-state, or enters into the detect state from the Recovery.RcvrCfg sub-state. When it is not determined that the state of the link enters into the configuration state (S320: NO), the state of the link enters into another sub-state (e.g., the Recovery.Idle sub-state or the Recovery.Speed sub-state) in the recovery state or the detect state (S340). The directed_speed_change variable is not set to 1b.

In accordance with the present disclosure, there can be provided an interface device and a computing system including the same, which can adaptively control a link speed according to an entry factor of a configuration operation during a link setting operation.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Furthermore, the embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. An interface device comprising:
   a plurality of ports configured to form a plurality of lanes; and
   a link controller configured to set a speed of a link including the plurality of lanes by determining the speed of the link based on a state of the link before entering into a configuration state of the link among a plurality of states of the link,
   wherein the link controller is further configured to set, when the link enters into an L0 state from the configuration state among the plurality of states of the link, the speed of the link to a first one of first and second speeds in response to a speed change variable having a first value, the second speed being higher than the first speed.

2. The interface device of claim 1, wherein the link controller includes a Link Training and Status State Machine (LTSSM) which sets the link.

3. The interface device of claim 2, wherein the link controller sets the speed by initializing, when the link enters into the configuration state from a polling state among the plurality of states of the link, the speed of the link by setting the speed change variable to the first value.

4. The interface device of claim 2, wherein the link controller sets the speed by maintaining, when the link enters into the configuration state from a sub-state within a first group in a recovery state among the plurality of states of the link, the speed of the link by setting the speed change variable to a second value.

5. The interface device of claim 4, wherein the link controller sets the speed by initializing, when the link enters into the configuration state from a sub-state other than a first group in the recovery state among the plurality of states of the link, the speed of the link by setting the speed change variable to the first value.

6. The interface device of claim 4, wherein the link controller is further configured to set, when the link enters into an L0 state from the configuration state among the plurality of states of the link, the speed of the link to a first one of first and second speeds in response to the speed change variable having the second value, the second speed being higher than the first speed.

7. The interface device of claim 2, wherein the link controller is further configured to set, when the link is determined to enter into the configuration state while the state is a sub-state within a first group in a recovery state among the plurality of states of the link, the speed change variable to a second value.

8. A method of operating an interface device, the method comprising:

allowing a state of a link connected to an external device to enter into a configuration state among a plurality of states of the link; and setting a speed of the link by determining the speed of the link based on a state of the link before entering into the configuration state, wherein the setting the speed of the link includes setting, when the link enters into an L0 state from the configuration state among the plurality of states of the link, the speed of the link to a first one of first and second speeds in response to a speed change variable having a first value, the second speed being higher than the first speed.

9. The method of claim 8, wherein the setting includes initializing, when the state of the link is a polling state among the plurality of states of the link, the speed of the link by setting the speed change variable to the first value.

10. The method of claim 8, wherein the setting includes maintaining, when the state of the link is a sub-state within a first group in a recovery state among the plurality of states of the link, the speed of the link by setting the speed change variable to a second value.

11. The method of claim 8, wherein the setting includes initializing, when the state of the link is a sub-state other than a first group in a recovery state among the plurality of states of the link, the speed of the link by setting the speed change variable to the first value.

12. A method of operating an interface device, the method comprising:

allowing a state of a link connected to an external device to enter into a configuration state among a plurality of states of the link;

first determining whether the link is to enter into the configuration state while the state of the link is one sub-state among sub-states of a recovery state included in the plurality of states of the link; and secondly determining a speed of the link in response to the first determining, wherein the first determining includes determining whether the link is to enter into the configuration state while the state of the link is a sub-state within a first group in the recovery state, and wherein the secondly determining includes setting, when the link is determined to enter into the configuration state while the state of the link is the sub-state within the first group, the speed of the link as a speed before the recovery state.

13. The method of claim 12, wherein the first determining includes determining whether the link is to enter into the configuration state while the state of the link is the sub-state other than the first group in the recovery state, and wherein the secondly determining includes initializing the speed of the link when the link is determined to enter into the configuration state while the state of the link is the sub-state other than the first group.

14. An operating method of a device, the operating method comprising:

setting, while configuring a link including a plurality of lanes, a speed of the link to a first value according to a first state of the link immediately before the configuring;

setting, while configuring the link, the speed to a second value according to a second state of the link immediately before the configuring; and setting the speed of the link includes setting, when the link enters into an L0 state from the configuration state among the plurality of states of the link, the speed of the link to a first one of first and second speeds in response to a speed change variable having the first value, the second speed being higher than the first speed.

* * * * *